US009692958B2

(12) United States Patent
Nattress

(10) Patent No.: US 9,692,958 B2
(45) Date of Patent: Jun. 27, 2017

(54) FOCUS ASSIST SYSTEM AND METHOD

(71) Applicant: RED.COM, Inc, Irvine, CA (US)

(72) Inventor: Thomas Graeme Nattress, Ottawa (CA)

(73) Assignee: RED.COM, INC., Irvine, CA (US)

( * ) Notice: Subject to any disclaimer, the term of this patent is extended or adjusted under 35 U.S.C. 154(b) by 0 days.

(21) Appl. No.: 14/561,059

(22) Filed: Dec. 4, 2014

(65) Prior Publication Data

US 2015/0215519 A1 Jul. 30, 2015

Related U.S. Application Data

(60) Continuation of application No. 13/624,738, filed on Sep. 21, 2012, now Pat. No. 8,927,916, which is a continuation of application No. 12/479,546, filed on Jun. 5, 2009, now Pat. No. 8,274,026, which is a division of application No. 11/561,785, filed on Nov. 20, 2006, now Pat. No. 7,544,919.

(51) Int. Cl.
*H04N 5/232* (2006.01)
*G03B 13/18* (2006.01)
*G06T 5/00* (2006.01)

(52) U.S. Cl.
CPC ......... *H04N 5/23212* (2013.01); *G03B 13/18* (2013.01); *G06T 5/001* (2013.01); *H04N 5/23293* (2013.01)

(58) Field of Classification Search
CPC .... G01J 1/20; G01J 1/42; G03B 13/18; G03B 17/20; H04N 5/23212; H04N 5/23293

USPC ......... 250/201.1, 201.2, 201.3, 201.4, 208.1, 250/201.8, 201.9, 202; 396/78, 79, 80, 396/82, 89, 123, 124; 348/207.11, 348/207.99, 208.99, 220.1
See application file for complete search history.

(56) References Cited

U.S. PATENT DOCUMENTS

| | | | |
|---|---|---|---|
| 4,251,143 A | 2/1981 | Stemme et al. | |
| 4,300,826 A | 11/1981 | Aoki et al. | |
| 4,313,657 A | 2/1982 | Tokutomi et al. | |
| 4,329,032 A | 5/1982 | Aoki et al. | |
| 4,341,451 A | 7/1982 | Krueger et al. | |
| 4,341,953 A | 7/1982 | Sakai et al. | |
| 4,344,686 A | 8/1982 | Stemme et al. | |

(Continued)

FOREIGN PATENT DOCUMENTS

| | | |
|---|---|---|
| AU | 2007324081 | 2/2014 |
| CN | 101558355 A | 10/2009 |

(Continued)

OTHER PUBLICATIONS

CANON, Digigal Video Camcorder Instruction Manual, XL H1, 2005, Japan, in 157 pages.

(Continued)

*Primary Examiner* — Georgia Y Epps
*Assistant Examiner* — Don Williams
(74) *Attorney, Agent, or Firm* — Knobbe, Martens, Olson & Bear LLP

(57) ABSTRACT

Focus assist systems and methods for imaging devices are provided. The focus assist systems and methods display focus level data to a user. There are a variety of methods of displaying focus level data to a user, including, but not limited to, graphs, highlights, symbols, and varied levels of brightness or color.

20 Claims, 14 Drawing Sheets

(56) References Cited

U.S. PATENT DOCUMENTS

| | | | |
|---|---|---|---|
| 4,373,791 A | 2/1983 | Araki | |
| 4,443,087 A | 4/1984 | Kashihara et al. | |
| 4,571,046 A | 2/1986 | Suzuki et al. | |
| 4,597,659 A | 7/1986 | Suda et al. | |
| 4,627,700 A | 12/1986 | Nakamura et al. | |
| 4,760,385 A | 7/1988 | Jansson | |
| 4,794,459 A | 12/1988 | Moberg et al. | |
| 4,994,843 A | 2/1991 | Kitazawa | |
| 5,239,170 A * | 8/1993 | Hughlett | G02B 21/244 250/201.3 |
| 5,264,889 A | 11/1993 | Ishida et al. | |
| 5,307,112 A | 4/1994 | Aoyama | |
| 5,496,106 A | 3/1996 | Anderson | |
| 5,528,332 A | 6/1996 | Furutsu | |
| 5,563,678 A | 10/1996 | Kusaka | |
| 5,659,812 A | 8/1997 | Uchiyama | |
| 5,687,409 A | 11/1997 | Miyamoto | |
| 5,909,598 A | 6/1999 | Kadohara | |
| 6,035,054 A | 3/2000 | Odaka et al. | |
| 6,584,284 B1 | 6/2003 | Odaka | |
| 6,937,284 B1 | 8/2005 | Singh et al. | |
| 7,324,151 B2 | 1/2008 | Onozawa | |
| 7,544,919 B2 | 6/2009 | Nattress | |
| 7,889,270 B2 | 2/2011 | Yamada et al. | |
| 7,978,247 B2 | 7/2011 | Nakajima et al. | |
| 8,274,026 B2 | 9/2012 | Nattress | |
| 8,927,916 B2 | 1/2015 | Nattress | |
| 2003/0174230 A1 | 9/2003 | Ide et al. | |
| 2003/0174233 A1 | 9/2003 | Onozawa | |
| 2004/0036792 A1 | 2/2004 | Moriya et al. | |
| 2004/0046938 A1 | 3/2004 | Gero | |
| 2004/0165879 A1 | 8/2004 | Sasaki et al. | |
| 2004/0218086 A1 | 11/2004 | Voss et al. | |
| 2005/0134719 A1 | 6/2005 | Beck | |
| 2005/0219362 A1 | 10/2005 | Garoutte | |
| 2005/0254812 A1 | 11/2005 | Kosaka et al. | |
| 2005/0259161 A1 | 11/2005 | Lan et al. | |
| 2006/0008264 A1 | 1/2006 | Yamaguchi et al. | |
| 2006/0045504 A1 | 3/2006 | Zarnowski et al. | |
| 2006/0055814 A1 | 3/2006 | Okawa | |
| 2006/0098970 A1 | 5/2006 | Sato | |
| 2007/0002143 A1 | 1/2007 | Elberbaum | |
| 2007/0264005 A1 | 11/2007 | Haubmann | |
| 2008/0074531 A1 | 3/2008 | Ide et al. | |
| 2008/0251733 A1 | 10/2008 | Anderton | |
| 2009/0009531 A1 | 1/2009 | Sudo et al. | |
| 2009/0109310 A1 | 4/2009 | Kobayashi et al. | |
| 2009/0245677 A1 | 10/2009 | Nattress | |
| 2011/0019058 A1 | 1/2011 | Sakai et al. | |
| 2011/0096220 A1 | 4/2011 | Matsumoto | |
| 2012/0314116 A1 | 12/2012 | Jannard et al. | |

FOREIGN PATENT DOCUMENTS

| | | |
|---|---|---|
| EP | 1 954 061 A1 | 8/2008 |
| EP | 2 031 866 | 3/2009 |
| EP | 2 100 188 | 8/2012 |
| HK | 1137518 | 2/2013 |
| JP | 2003-011884 | 1/1991 |
| JP | 05-127243 | 5/1993 |
| JP | 05-127244 | 5/1993 |
| JP | 11-298791 | 10/1999 |
| JP | 2002-209135 | 7/2002 |
| JP | 2003-140024 | 5/2003 |
| JP | 2003-153043 | 5/2003 |
| JP | 2004-072297 | 3/2004 |
| JP | 2004-224009 | 8/2004 |
| JP | 2005-345590 | 12/2005 |
| JP | 2006-1089733 | 4/2006 |
| JP | 2006-140594 | 6/2006 |
| JP | 2007-206672 | 8/2007 |
| JP | 2008-072696 | 3/2008 |
| JP | 2008-113466 | 5/2008 |
| JP | 2008-292622 | 12/2008 |
| JP | 2009-111487 | 5/2009 |
| JP | 2010-016798 | 1/2010 |
| JP | 5099529 | 10/2012 |
| JP | 2014-519052 | 8/2014 |
| KR | 10-1417169 | 7/2014 |
| MX | 286949 | 10/2009 |
| RU | 2466438 | 11/2012 |
| SG | 152599 | 11/2011 |
| TW | I416943 | 11/2013 |
| WO | WO 2008/063811 | 5/2008 |
| WO | WO 2012/015485 | 11/2012 |

OTHER PUBLICATIONS

CANON, HD Video Camera Recorder Instruction Manual, XH G1/XH A1, 2006, Japan, in 164 pages.
European Communication received from European Patent Office in related Application No. EP07844578,0, in 5 pages, dated Mar. 31, 2011.
Examination Report Received in related Application No. NZ577055, in 2 pages, dated Dec. 20, 2010.
http://pro.jvc.com/prof/attributes/tech_desc/jsp?model_id=MDL101642&feature_id=02, 2 pages.
http://pro.jvc.com/prof/attributes/tech_desc/jsp?model_id=MDL101623&feature_id=02, 3 pages.
International Search Report and Written Opinion for PCT Application No. PCT/US2012/036602, date of mailing, Jul. 18, 2012.
International Search Report for PCT Application No. PCT/US2007/082434. date of mailing May 6, 2008.
JVC, HD Camera Recorder, GY-HD100, GY-HD101, HDV Mini DV Instructions, LWT0278-001A-H, 2005 Victor Company of Japan, Limited.
JVC, JVC HDV Camcorder GY-HD100 Technical Report, 7 pages.
Katz, A.A., The White Paper, "Chapter 12: Extending Your Reach: Close-up and Macro," 2005. available at http://www.aakatz.com/whitepaper/part12.htm, in 40 pages.
Office Action in Russian Application No. 2009119259/28 (026524)dated Sep. 8, 2011.
Office Action received in related Chinese Application No. 200780042981.4 in 5 pages, dated Dec. 11, 2012.
Patent Modified Examination Report No. 1 received in related Australian Application No. 2007324081 JP2009 in 3 pages, dated Dec. 6, 201.
Rejection Decision received in related Chinese Application No. 200780042981.4 in 5 pages, dated Jul. 3, 2013.
SONY, Cyber-shot, Digital Still Camera User's Guide/Troubleshooting, DSC-H2/H5, 2006, Japan, in 123 pages.
SONY, Digital Video Camera Recorder, HVR-A1N/A1P, 2005, Hong Kong, in 10 pages.
Translation of Examination Report received in New Zealand Application No. 577055 in 2 pages dated Dec. 20, 2010.
Translation of Office Action received in related Application No. CN200780042981.4, in 6 pages, dated Aug. 26, 2010.
Translation of Office Action received in related Application No. CN200780042981.4, in 6 pages, dated Mar. 7, 2012.
Translation of Office Action received in related Application No. JP2009-537260, in 3 pages, dated May 11, 2011.
Translation of Office Action received in related Application No. JP2009-537260, in 6 pages dated Feb. 14. 2012.
Translation of Office Action received in related Korean Application No. 10-2009-7011999 in 10 pages dated Jun. 18, 2013.
Translation of Office Action received in related Taiwan Application No. 096141532, in 14 pages, dated May 28, 2013.
Written Opinion issued from Australian Patent Office in related Application No. SG200903348-1 , in 6 pages, dated Apr. 7, 2010.
Written Opinion received in related Singapore Application No. SG 200903348-1 in 7 pages dated May 19, 2010.
Yenra, Sony HDV Camcorder, Sep. 7, 2014, in 2 pages.
Office Action in related Canadian Application No. 2669580 dated Jan. 27, 2014.
Office Action in related Canadian Application No. 2669580, in 3 pages, dated Feb. 26, 2015.

(56) References Cited

OTHER PUBLICATIONS

Office Action in related European Application No. 12 720 762.9, in 6 pages, dated Nov. 11, 2014.
Office Action in related European Application No. 12 720 762.9, in 6 pages, dated Nov. 19, 2015.
Office Action in related Japanese Application No. 2014-509495 in 8 pages, dated Dec. 25, 2015.
Notice of Allowance in Canadian Application No. 2,669,580 dated Feb. 4, 2016 in 1 page.
Office Action in related Japanese Application No. 2014-509495 in 8 pages, dated Sep. 6, 2016.
Decision to Grant in related Japanese Application No. 2014-509495 in 5 pages, dated Feb. 1, 2017.

* cited by examiner

FOCUS ASSIST SYSTEM AND METHOD

CROSS-REFERENCE TO RELATED APPLICATIONS

This application is a continuation of U.S. patent application Ser. No. 13/624,738, filed Sep. 21, 2012, which is a continuation of U.S. patent application Ser. No. 12/479,546, filed Jun. 5, 2009, now issued as U.S. Pat. No. 8,274,026, which is a divisional of U.S. patent application Ser. No. 11/561,785, filed Nov. 20, 2006, now issued as U.S. Pat. No. 7,544,919. Each of the applications referenced in this paragraph is incorporated by reference herein in its entirety so as to form a part of this specification.

BACKGROUND

Field

The invention relates to providing focus information.

Description of Related Art

There are two basic methods of focusing a camera or optical instrument.

In an autofocus system, the camera sets the focus level with little or no user input. The camera collects data about the relative focus level of objects in the camera lens. It uses an algorithm to interpret that data and set an optimum focus level. However, this algorithm does not necessarily execute the photographer's intentions. Many autofocus algorithms prioritize objects that are close to the center of the frame or that are brightly lit. If the object of the photographer's interest is off-center or dimly lit, the autofocus algorithm may calibrate a focus level based on objects in which the photographer has no interest.

Manual focus cameras require more effort from the user. But, they also give the photographer more control over the focus level. Because manual focus cameras are more responsive to the user's wishes and potentially more precise, professionals often use manual focus cameras.

Whichever system a camera employs—autofocus or manual focus—the ability of the system to yield desirable results depends on the user's ability to confirm which objects are in or out of focus. In an autofocus system, if it is unclear which objects are in or out of focus, the user cannot confirm that the autofocus algorithm has identified the user's primary objects of interest and set the focus level accordingly. In a manual focus system, if a user cannot confirm which objects are in or out of focus, the user cannot confirm the precision of focus adjustments.

Camera displays may be too small or imprecise to reliably convey to the user whether or not an object is in focus, or if out of focus, just how much out of focus. They do not often allow the user to distinguish between gradations in the focus level or balance the focus level between multiple objects in the viewfinder.

SUMMARY

An optical lens having a variable focal length is used to detect an image. The lens focuses the image on a sensor, and the sensor captures information corresponding to individual picture elements (pixels). A display shows the detected image.

In order to assist a user adjust the focus of the image, a waveform indicates a degree of focus. The waveform may be superimposed on the image, or may be displayed adjacent to the image. Alternatively, the waveform may be displayed on a separate screen. The waveform is updated in real-time, allowing the user to adjust the focus contemporaneously. The display of the degree of focus could be used, e.g., for still cameras and motion picture cameras.

The optical sensor converts the image from the lens into a two-dimensional, digital array of pixels, with the array of pixels arranged in rows and columns. In one embodiment, a processor operates on a row of pixels to determine focus level data for a plurality of pixels in that row.

The waveform may indicate the degree of focus through color variations, intensity variations, density variations, amplitude variations, or other visual indicia. A combination of different types of indicia may be used.

The focus level data may be determined, for example, with an edge detection algorithm. In one embodiment, the focus level data is determined by comparing at least a portion of the digital array of pixels with a blurred rendition of the same portion of the array.

In one embodiment, an image is detected using a two-dimensional array of optical sensors. The detected image is converted into a data structure that represents the detected image as a two-dimensional array of pixel values, where the pixel values are representative of an amount of light detected by the optical sensors. A blurred image is generated by combining a selected pixel value with a plurality of pixel values from the vicinity of the selected pixel value. The degree of focus is then determined by comparing the selected pixel value with a corresponding blurred image pixel value. A visual indication of the degree of focus is then provided. In one embodiment, the visual indication of the degree of focus may be overlaid on a representation of the detected image. In another embodiment, the visual indication of the degree of focus is adjacent to a representation of the detected image. Providing the visual indication of the degree of focus may comprise displaying a waveform corresponding to the degree of focus. A point on the waveform may corresponds to an average degree of focus for a plurality of vertically aligned pixels. In another embodiment, a point on the waveform may correspond to an average degree of focus for a plurality of horizontally aligned pixels. In yet another embodiment, a point on the waveform may correspond to an average degree of focus for a plurality of pixels in a block. In a further embodiment, a point on the waveform corresponds to an average degree of focus for a plurality of non-adjacent pixels.

In one embodiment, a method of providing feedback to allow focusing an image in real time comprises using a programmed algorithm to determine a degree of focus of a plurality of regions and providing a visual indication of the degree of focus of each region. The visual indication may take a variety of formats, such as, for example, a waveform, varying the relief of a region, or indication of focus by a geometric figure. The region may be, for example, a line or a regular geometric pattern. In one embodiment, the degree of focus of a region may indicated by varying the color of the region. In another embodiment, the degree of focus of a region may be indicated by varying the brightness of the region. The regions may be described by edge detection, and the degree of focus of each region may be indicated by varying, e.g., the brightness or color of an edge.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

DETAILED DESCRIPTION

The following description of different implementations has been presented by way of example only, and should not be read in a limiting sense. The scope of the present invention is defined only by the claims.

In one embodiment, a camera displays focus level data to a user. The focus level data may be superimposed on the primary viewfinder screen, or it may be displayed on a secondary screen. Various optical imaging systems—such as the motion picture camera or the photo camera—might generate and display focus level data. However, the invention is not limited to cameras. Any optical imaging system can display focus level information to the user. Examples include light microscopes, telescopes, or binoculars. Similarly, non-optical instruments that produce an image can also display focus level information to the user. An example is an electron microscope. Further, an algorithm can generate and display focus level data to the user for images or videos after they have been recorded.

Figure 1:
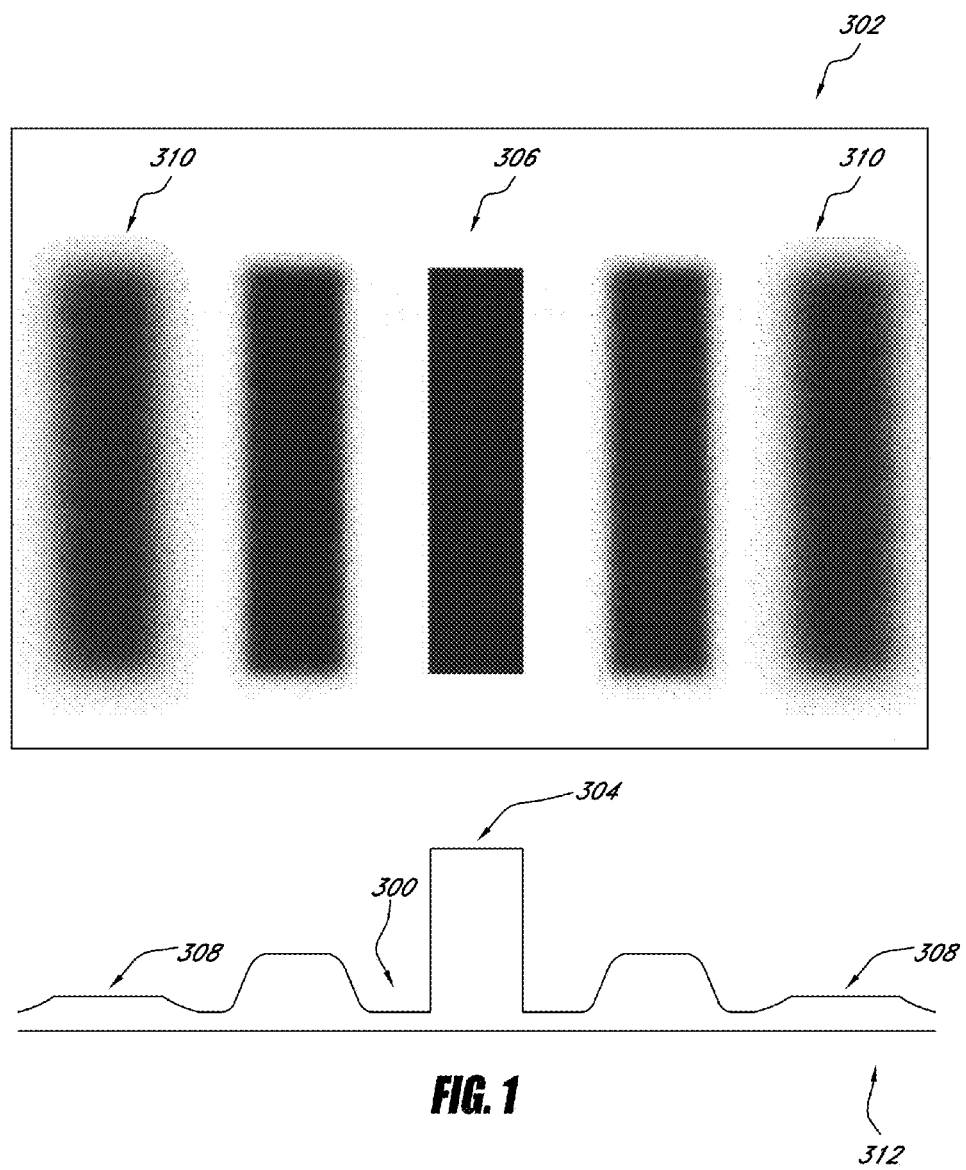
FIG. 1 shows a horizontal line graph conveying focus level data.

A wide variety of different display techniques convey focus level data to the user. For instance, FIG. 1 shows a line graph 300 oriented below the image 302. Alternatively the camera or display might show the line graph superimposed on the image. The line graph 300 displays higher values 304 for objects in greater focus 306. It displays lower values 308 for less well focused objects 310. The x-axis 312 represents a baseline level of focus, below which no focus level data is displayed. The x-axis 312 threshold may be set according to a number of different criteria. It might reflect some absolute number-value related to the slope of the gradient—the gradient being calculated by an edge detection algorithm as explained below. Or, the threshold might be tied dynamically to an average focus level of the entire image. So, the threshold could be set to 150% or 200% of the average focus level. This mechanism could be used to eliminate row, "noise" values from the display or to display data only for those display objects considered to be in focus or relatively in focus.

In one embodiment, the focus level data displayed on line graph 300 covers a continuous range of focus level values—or at least continuous in a discrete, digital sense, limited by pixels and sampling rate. This does not necessarily mean that the values on the line graph 300 correspond one for one to the focus level value at a given point on the image 302. The line graph 300 may be continuous, and yet represent an adjusted function of the raw focus level data that is better perceived by the user.

A single, horizontal line graph 300 like the one in FIG. 1 might not accurately convey focus level information for objects oriented vertically in the image. Because the line graph displays only one value for each horizontal point, it might obscure different focus levels oriented vertically with respect to that point.

Figure 2:
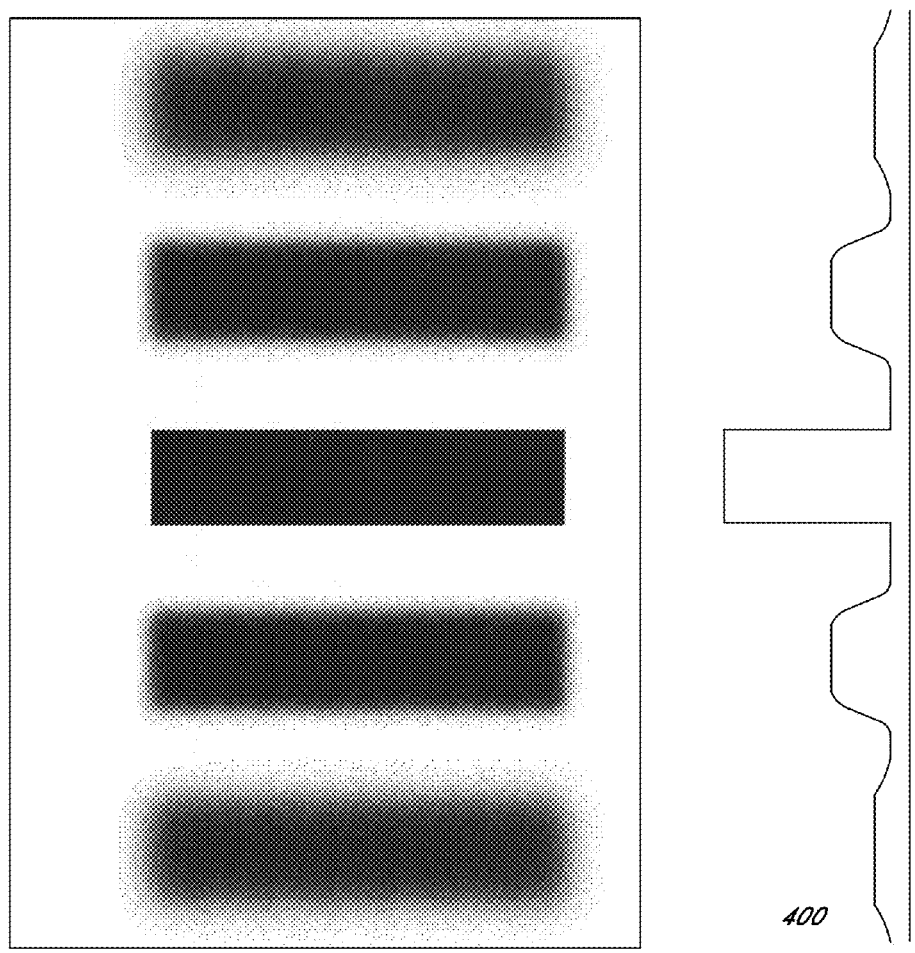
FIG. 2 shows a vertical line graph conveying focus level data.

FIG. 2 shows a vertical line graph 400 display. It displays more accurate focus level information for vertically oriented objects, but might obscure different focus levels for horizontally oriented objects. Another display might combine vertical and horizontal line graphs. Such a display overcomes some of the disadvantages of either the horizontal or vertical displays alone. But, depending upon how the data is presented, it may require the user to glance at two different locations to obtain focus level information for what may be a fleeting image.

Figure 3:
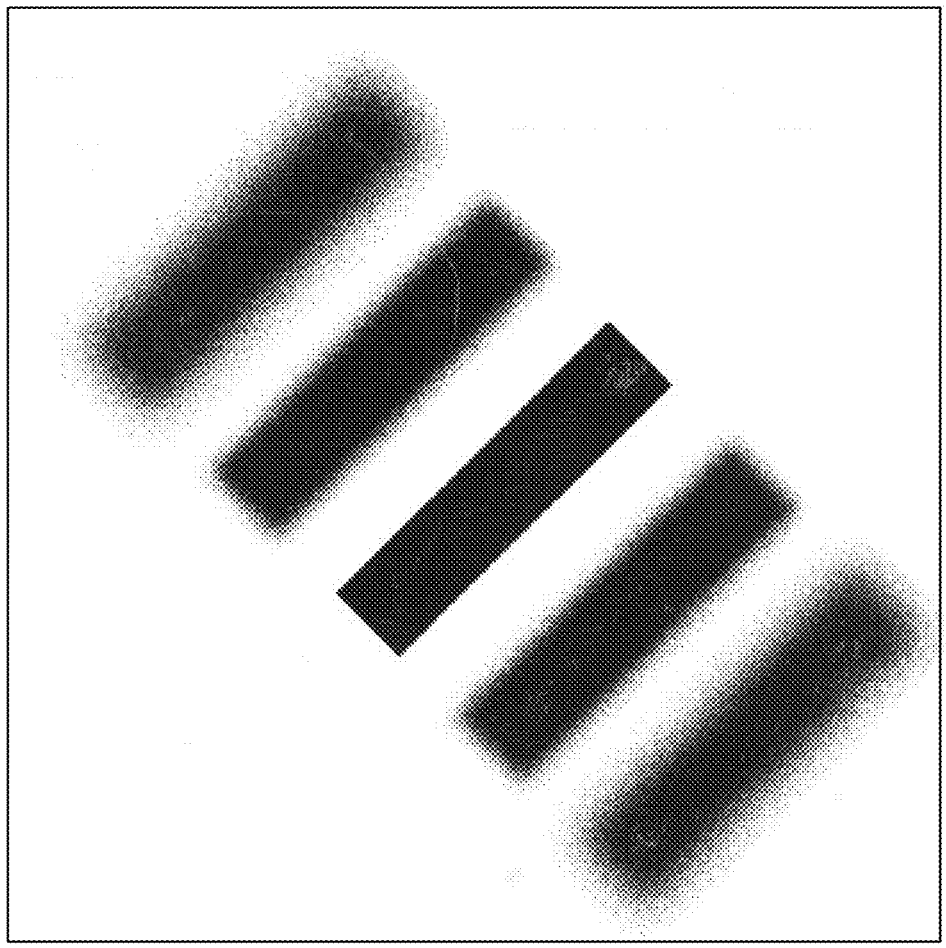
FIG. 3 shows a horizontal line graph conveying focus level data with three separate lines.
Figure 3:
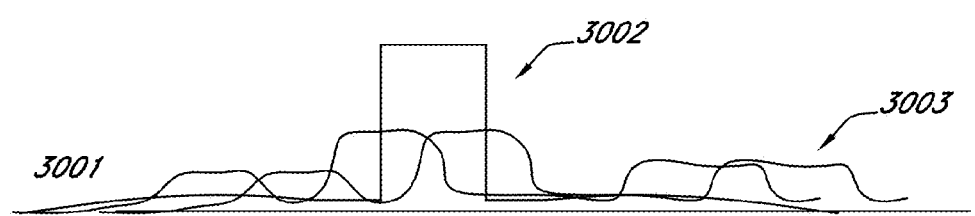

FIG. 3 shows another horizontal line graph. However, this horizontal line graph comprises several lines. Each line represents focus level information for a different area of the image 302. For example, one or more lines 3001 represent focus level information for the top of the image 302. One or more lines 3002 represent focus level information for the middle of the image 302. One or more lines 3003 represent focus level information for the bottom of the image 302. Where the focus level is very similar at the top, middle, and bottom of the image, the lines begin to overlap and intensify.

Figure 4:
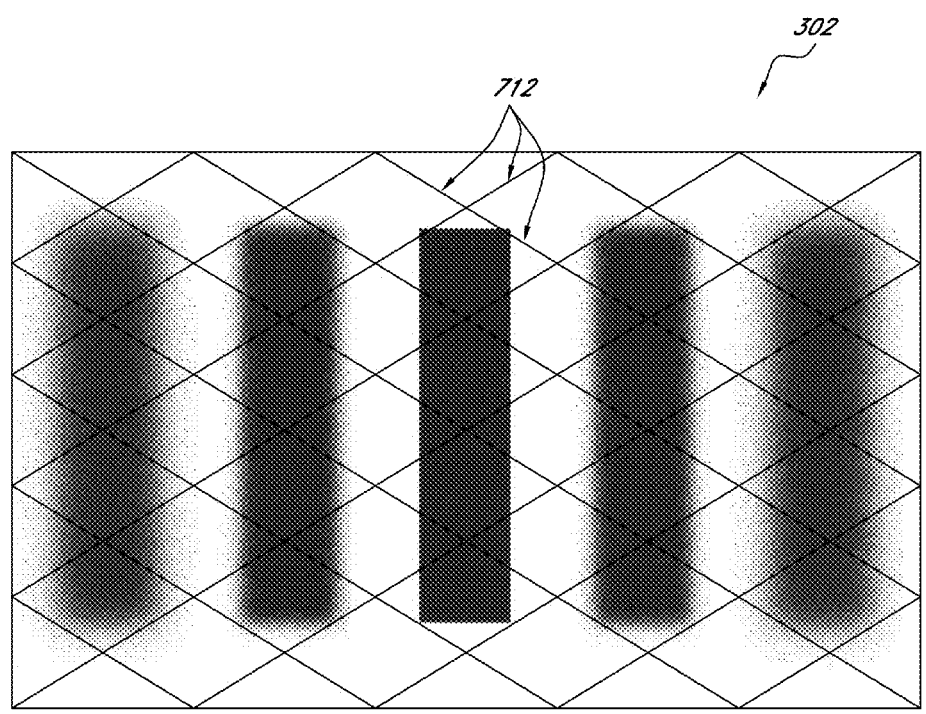
FIG. 4 shows a grid overlaid on an image, by which grid, focus level data may be calculated or displayed.

Other embodiments do not use a graph display. For instance, FIG. 4 shows a grid 712 superimposed on the image 302. The grid 712 itself need not be visible to the user. But, the grid regions 714 each indicate a focus level. One method of indicating focus level is a color tint on the region 714. So, a very well focused region 714 might have a first color such as a red tint. A very poorly focused region 714 might have a second color such as a violet tint. Regions 714 with focus levels neither very well nor very poorly focused may carry a tint along the color spectrum, which correspond to their respective focus levels.

Another method of indicating focus level within a grid region 714 is to vary the brightness level of each region 714. A very well focused region 714 might have a first, relatively high brightness. A very poorly focused region 714 might have a second, relatively low (dark) brightness. Regions 714 with focus levels in between may carry a level of brightness corresponding their respective focus levels.

Figure 5:
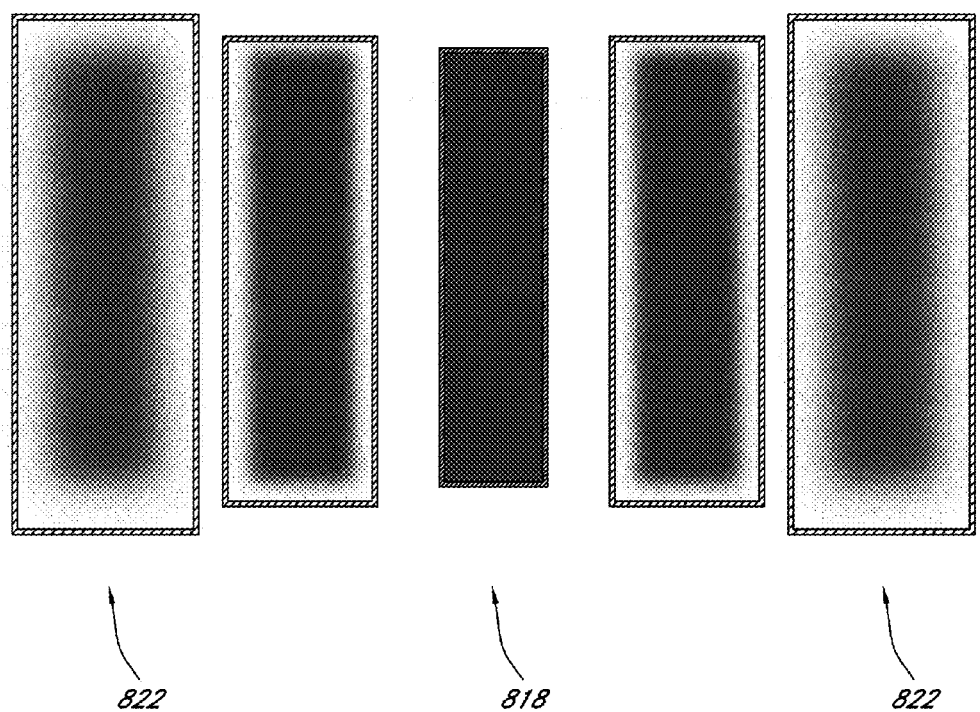
FIG. 5 shows highlights around objects, which highlights convey focus level data.

Other display embodiments highlight the objects themselves instead of using grids or graphs to display focus level data for a general area. In FIG. 5, the most focused object 306 has a bright highlight 818 that traces the object's edge. The least focused objects 310 have very dim highlights 822. The brightness of the highlight varies with the focus level of the object.

Alternatively, the display might draw a color tint around the edges of objects to indicate their respective focus levels.

For instance, objects that are focused very well 306 would have a first color such as a red tint at their edge. Very poorly focused objects 310 have a second color such as a violet tint at their edge. Objects that are neither very well nor very poorly focused would carry a tint along their edge corresponding to their respective focus levels.

Rather than merely highlighting around each object, one embodiment raises the relief of an entire object when it is in focus. Objects that are out of focus 310 appear either flat or at a negative relief. Focused objects 306 rise up from the image, while unfocused objects 310 recede. The relief of each object corresponds to its focus level. This implementation has the advantage that the user can concentrate on the objects in the viewfinder to glean focus level data. Because this embodiment is highly intuitive, the user does not need to interpret much display data to determine the relative focus levels of objects in the display.

Figure 6:
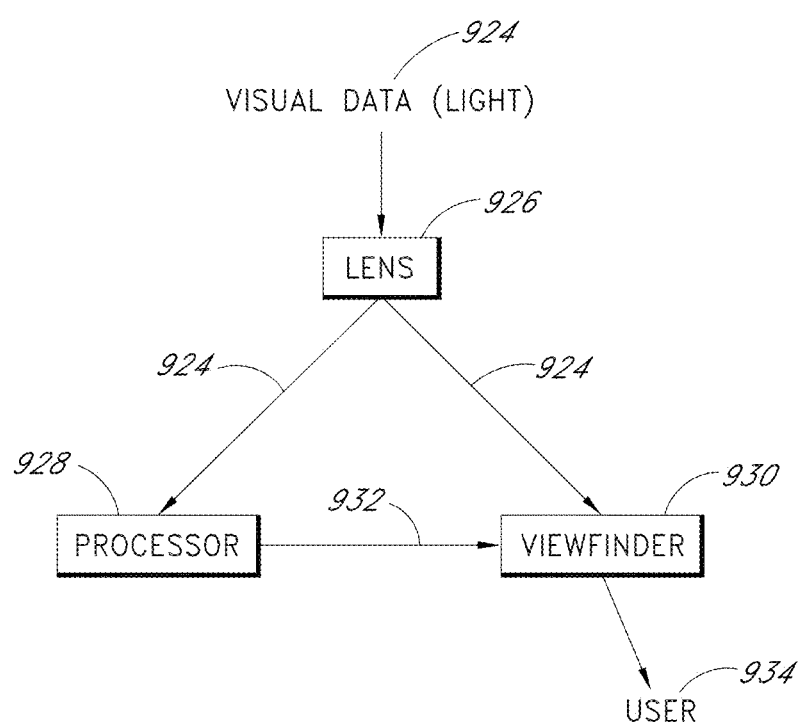
FIG. 6 shows a high-level diagram of the focus assist system.

FIG. 6 shows an embodiment of the architecture of a camera. The camera collects visual data 924 from the camera lens 926. The camera records the visual data 924 and displays a representation of the visual data 924 on the viewfinder 930. The camera also sends the visual data 924 to a processor 928. The processor uses an algorithm to compute focus level data 932 for the visual data 924. The processor sends that focus level data 932 to the viewfinder, where the user 934 sees it superimposed on the visual data 924. The viewfinder 930 shows focus level data 932 from the processor 928 and visual data 924 from the lens 926 contemporaneously.

In an alternative embodiment (not shown), in an autofocus camera, the processor that accepts the visual data and computes the focus level data is also the processor that computes focus level data for the autofocus system. An autofocus system automatically generates focus level data to determine the proper focus level setting. In this embodiment, that data is reused. Not only does the camera use the focus level data to achieve an optimal focus setting, but the data is also sent to the user through the viewfinder. The user can then confirm that the autofocus system has identified and set the focus level for the object or objects in which the user is interested.

The processor uses an algorithm to calculate the focus level data displayed to the user.

In one embodiment, the processor blurs image data to create a comparison image. For instance, the processor might use a Gaussian or quick box blur approximation, or convolve the image. The blurred image differs from the original image primarily at the edges of focused objects 306. With focused objects 306, the blurring process washes out the sharp contrast between the edge of the object 306 and its surroundings. The blurring process creates less change at the edges of unfocused objects 310. The soft contrast between an unfocused object 310 and its surroundings remains a soft contrast in the blurred, comparison image. Because edges are typically composed of the pixels that change the most during the blurring process, it is possible to find the edges of focused objects.

Several alternative algorithms exist to detect whether or not an image is in focus. Many of these are "edge detection" algorithms. Examples of edge detection algorithms can be found in *Fundamentals of Digital Image Processing* by Anil K. Jain, the entirety of which is incorporated here by reference.

One algorithm uses gradient operators to detect edges. Gradient operators are masks, or simple matrices, used to generate a gradient map. Gradient operators, when convolved with pixels in an image, yield a gradient map in two orthogonal directions. Similarly, compass operators yield a gradient map in a selected number of directions that correspond to compass directions. Once the gradient has been calculated, an edge is identified by searching for those spots where the gradient exceeds some threshold. The level of focus, generally, corresponds to the severity of the gradient.

Other edge detection algorithms apply a second-order derivative to the image. The derivative detects rates of change in pixel intensity across the image. Again, the algorithm usually convolves the image with an operator. Edges are identified by locations where the gradient exceeds some threshold, or more commonly, by searching for spots where the second derivative wave-form crosses zero. While zero crossings are useful to detect edges, they only return a binary value and therefore do not convey precise focus level data. Here again, the focus level generally corresponds to the severity of the gradient at objects' edges.

The gradient measures changes in the intensity of adjacent pixels. The intensity may be measured according to one or more of several different elements of each pixel. The intensity may refer to the red, green, or blue content of a pixel or any combination thereof. In YCbCr systems, it may refer to the luma or chroma component of each pixel or a combination thereof. In HSV systems, it may refer to the hue, the saturation, or the brightness components of the pixel, or any combination thereof. Depending on the color space of processing and display systems, the processor may use whichever components of the pixels' value that obtain the optimal gradient map or optimal focus level data.

One way of using an edge detection algorithm to derive focus level data for an entire image—rather than its edges only—is to use boundary extraction. By connecting edges, boundaries define the shape of an object. Assuming that an entire object is in focus if its edges are in focus, the camera can use boundary detection to determine the object's shape and impute the focus level at the object's edge to the rest of the shape.

A contour following algorithm is a boundary extraction algorithm that uses a series of horizontal or vertical steps chosen by trial and error. The correct step is determined by whether the step arrives inside or outside a boundary.

Another boundary extraction algorithm uses the computer science principle of dynamic programming. With dynamic programming the solution to a large problem is a function of the solutions to its sub-problems. In the boundary extraction context, that means that optimal sub-paths will lead to the optimal boundary.

The focus level detection algorithm measures focus level for a selection of pixels. The number and location of the pixels for which the algorithm calculates focus level data are a function of the speed of computation, detail of focus level data, and type of focus data desired to be displayed to the user.

Figure 7:
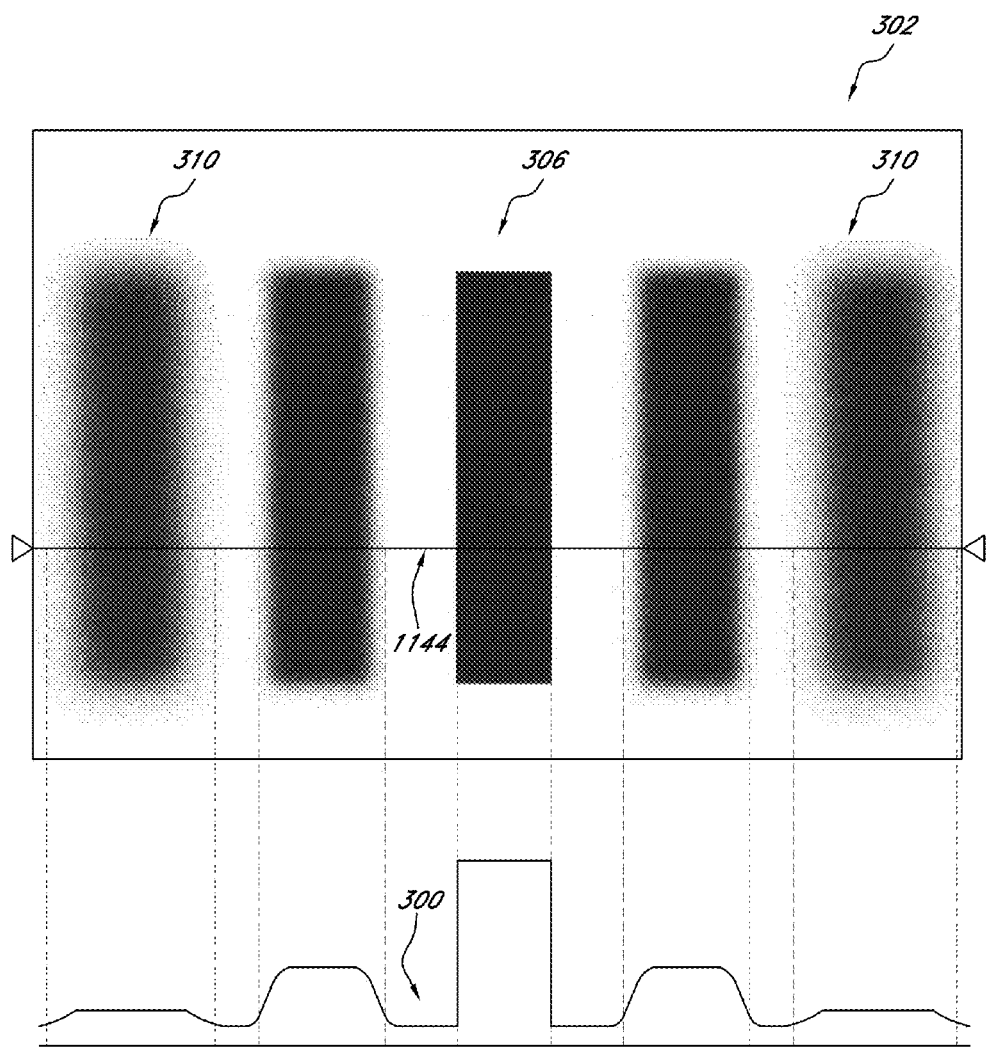
FIG. 7 shows a horizontal line graph conveying focus level data from a horizontal scan line.

In one embodiment, the focus level algorithm calculates focus level data for one or more "scan lines." The simplest example of the scan line embodiment is depicted in FIG. 7. In that figure, a single scan line 1144 extends horizontally across the image 302. The scan line 1144 need not be vertically centered. The user can adjust the position of the scan line 1144. The focus level algorithm calculates a focus level value for each pixel along the scan line 1144 and displays it as a point along line graph 300. In another embodiment, to save processing time, the focus level algorithm might measure no more than about 50% or no more than about 25% of the pixels, such as by measuring only every other pixel or only one of every several pixels on the scan line 1144. Line graph 300 shows how the focus level display corresponds to the focus level measured at each pixel along the scan line 1144.

Figure 8:
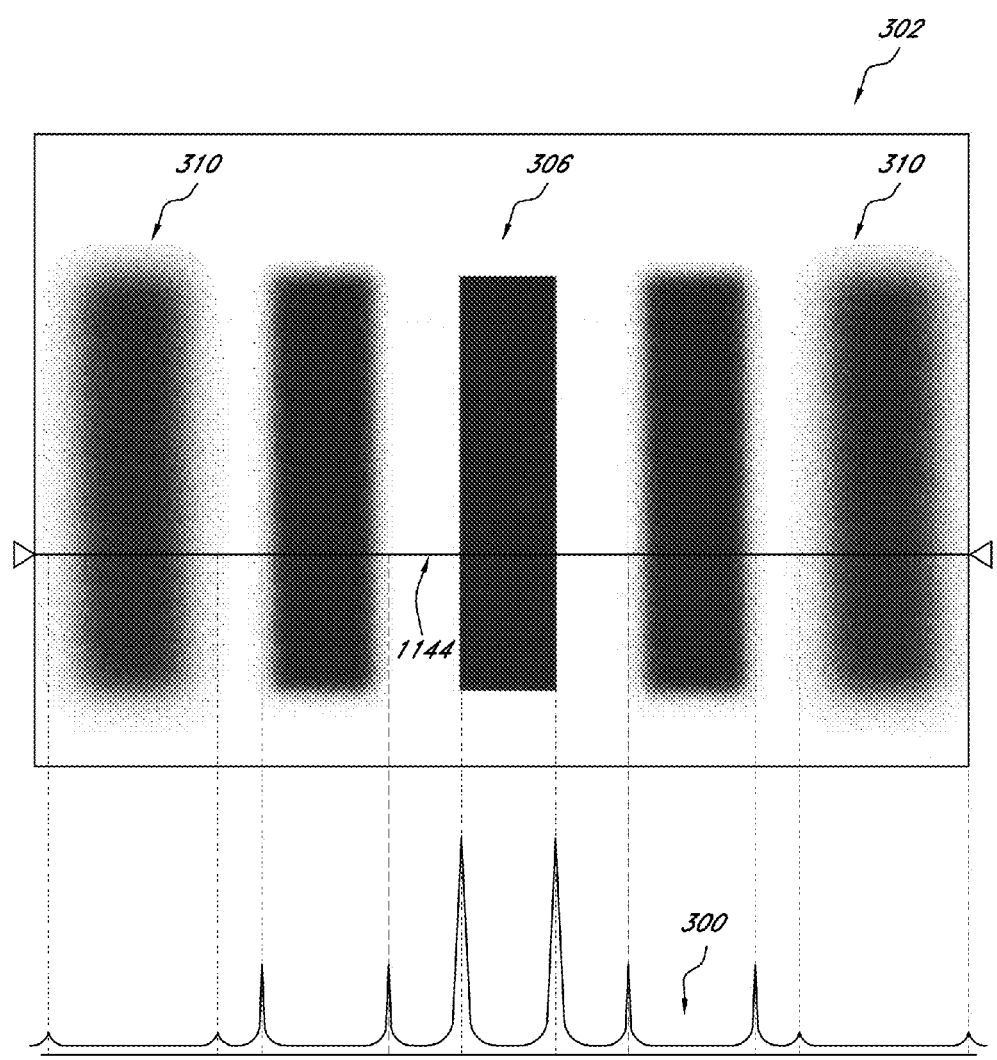
FIG. 8 shows a horizontal line graph conveying focus level data from a scan line, wherein the focus level data has been calculated using an edge detection algorithm.
Figure 11:
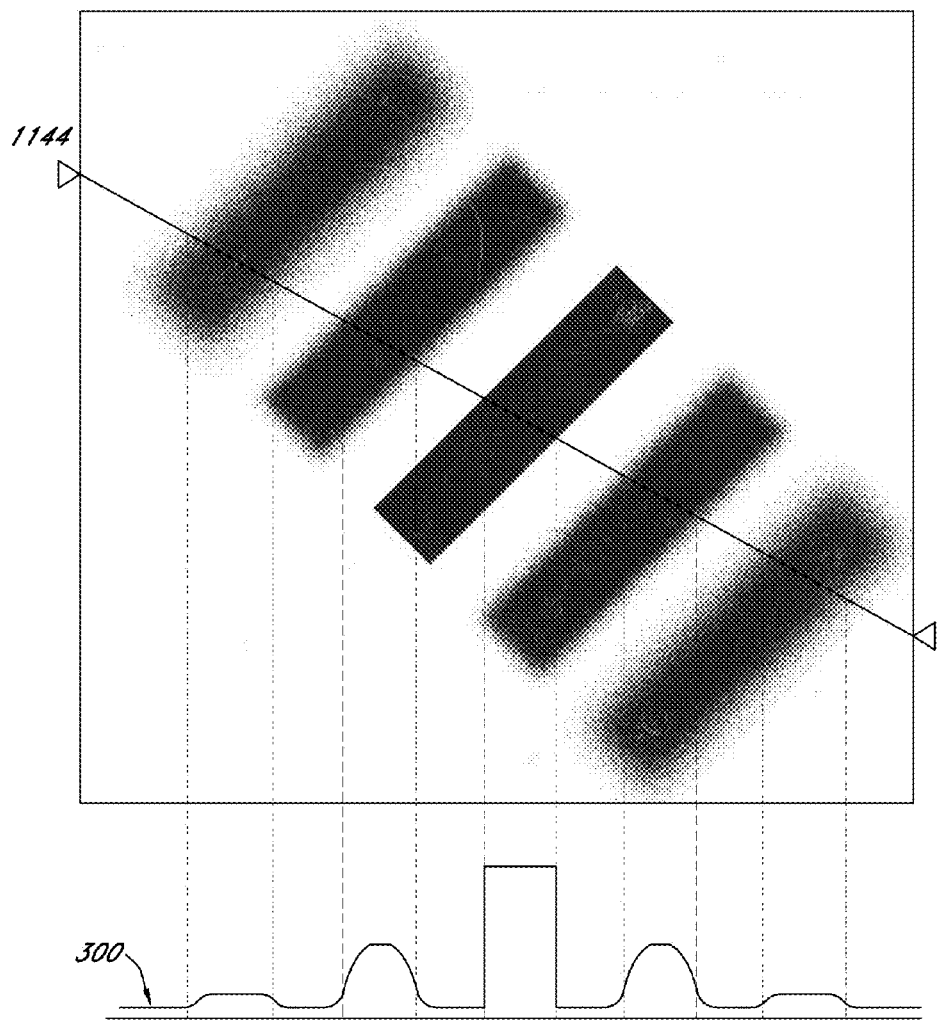
FIG. 11 shows a horizontal line graph conveying focus level data from a sloped scan line.

In FIG. 8, the scan line 1144 and display technique are identical to those of FIG. 11. But, instead of a smooth waveform, the line graph 300 has spikes. This spiked waveform depicts the data produced by an edge detection algorithm. The focus level data is more accurate at the edges of objects. At the edges of bars that are focused 306, the graph 300 shows a high value. Likewise, at the edges of bars that are not focused 310, the graph 300 shows low values. But, the graph 300 does not show high or low values for the middle parts of objects. In the middle parts of objects, the correspondence between high contrast—on which edge detection algorithms rely—and high focus, is less reliable. This is because the middle parts of objects are less likely to have high contrast values whether they are in focus or not.

Figure 9:
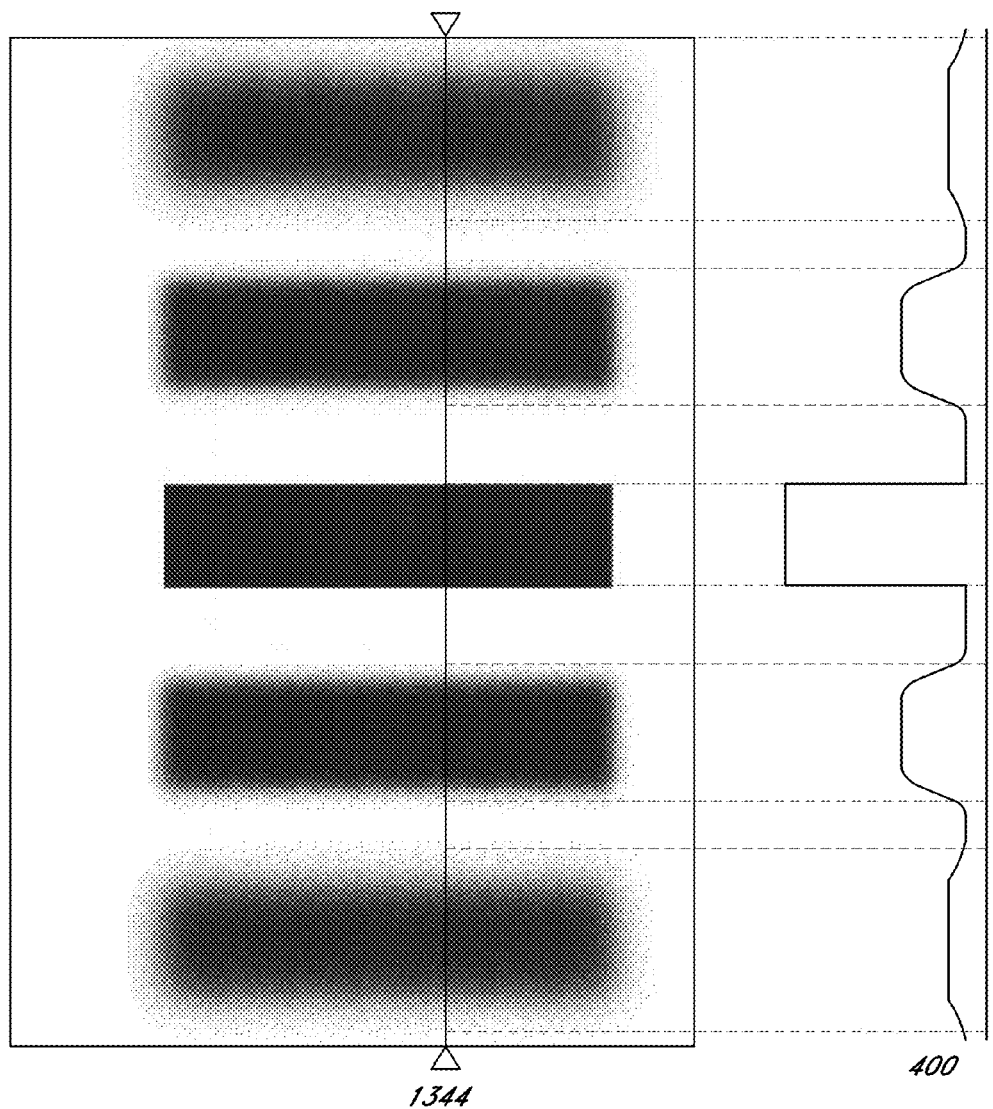
FIG. 9 shows a vertical line graph conveying focus level data from a vertical scan line.
Figure 10:
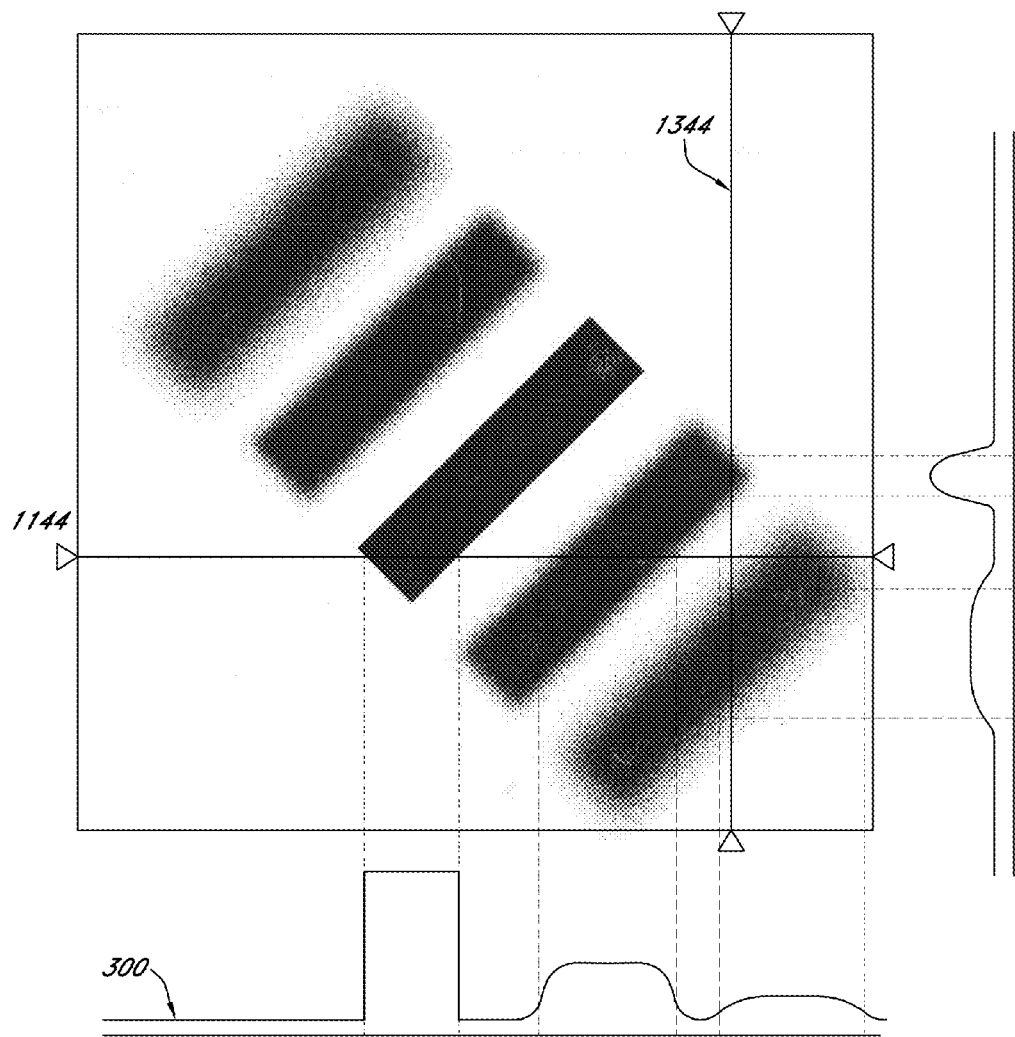
FIG. 10 shows horizontal and vertical line graphs conveying focus level data from horizontal and vertical scan lines, respectively.

The scan line 1344 might be vertically oriented, as in FIG. 9, rather than horizontally oriented. A vertical scan line 1344 gives better focus level data for a series of objects oriented vertically in the viewfinder. Like the horizontal chart for a horizontal scan line, a vertical chart 400 displays focus level data for a vertical scan line. Another, more detailed embodiment depicted in FIG. 10 employs both vertical 1344 and horizontal 1144 scan lines and both vertical 400 and horizontal 300 graphs.

The scan line need not run precisely horizontally (or vertically) across the image. The scan line 1144 might run at a slope, as in FIG. 11.

Figure 12:
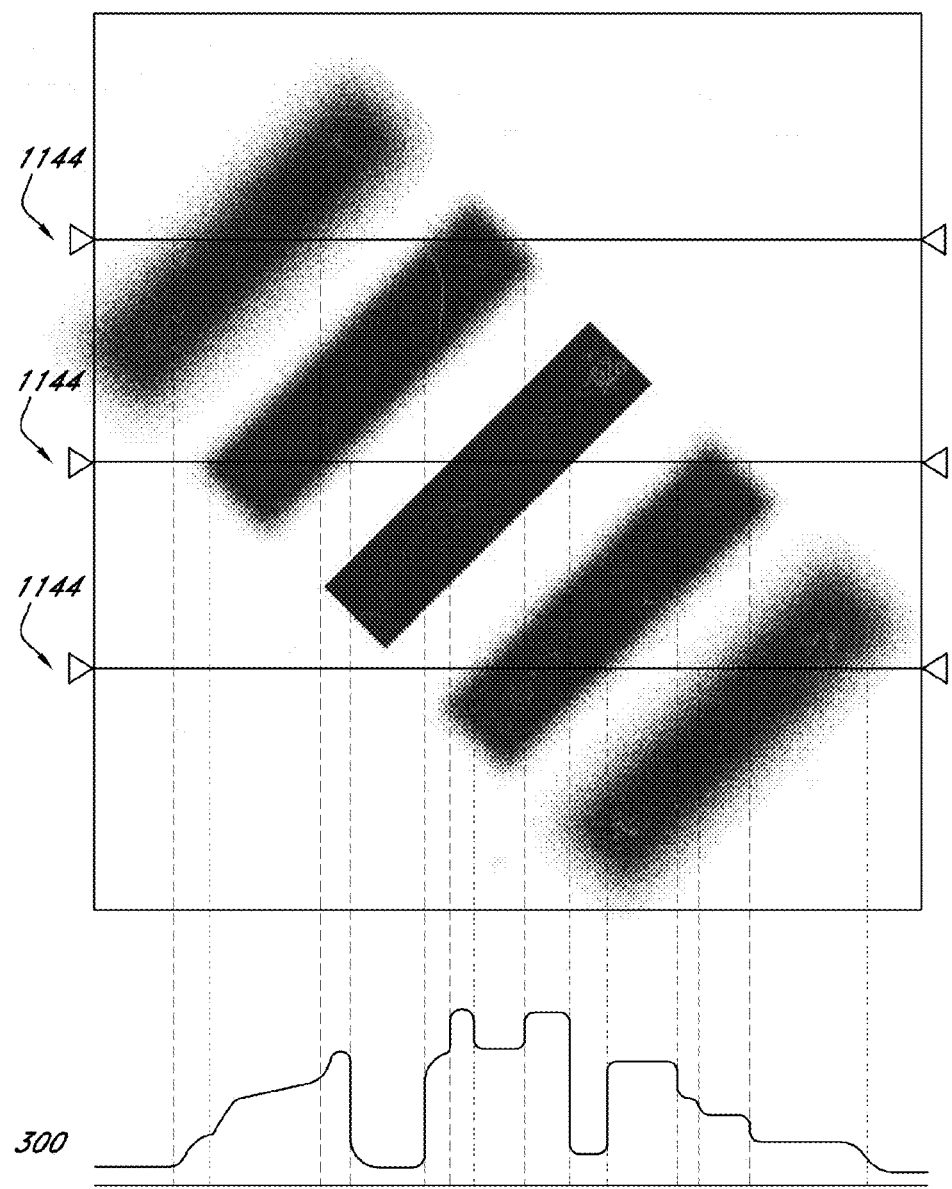
FIG. 12 shows a horizontal line graph conveying focus level data averaged from three scan lines.

In FIG. 12 the display again consists of a single-line graph 300. And, the algorithm again uses scan lines to identify the pixels for which it will calculate focus level data. But, instead of using only a single scan line, the algorithm averages data from multiple scan lines 1144, such as at least two, in some embodiments at least five, and in other embodiments at least 10 scan lines. Depending on the location of the scan lines and of objects in the image, this technique may improve the accuracy of the focus level display. The more scan lines 1144 the processor employs, the more focus level data it collects and the more accurate it will be. But, the more scan lines 1144 the processor employs, the more computations it must run and the slower it will generate focus level data. Again, the camera might use vertical scan lines 1344 instead of or along with horizontal scan lines 1144 for this or any scan-line technique.

Figure 13:
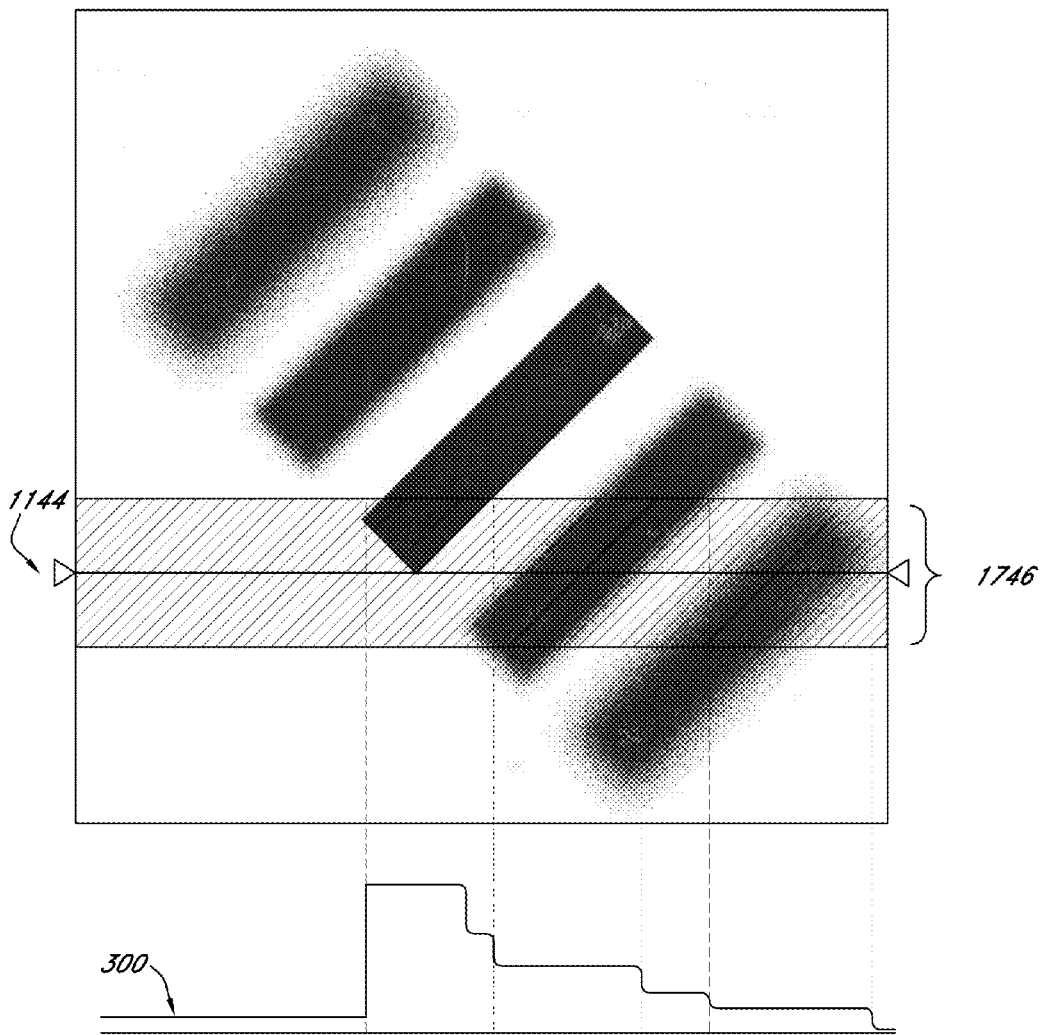
FIG. 13 shows a horizontal line graph conveying focus level data averaged from a scan line greater than one pixel wide.

FIG. 13 shows yet another embodiment based on the scan line. However, in this embodiment, the scan line 1144 is greater than a pixel in width. The scan-line width 1746 may be set to as many or as few pixels as desired. In fact, this is a variation on the multiple scan-line embodiment depicted in FIG. 12. A scan line 1144 a number of pixels in width 1746 is the same as that same number of adjacent scan lines, each one pixel in width. For example, the average focus level of a scan line 1144 five pixels wide 1746 is identical to the average focus level of 5 scan lines 1144, each adjacent to the next. To limit power consumption or decrease computational time, the processor might calculate focus level data only for every other adjacent scan line 1144 or one of every several adjacent scan lines 1144.

Figure 14:
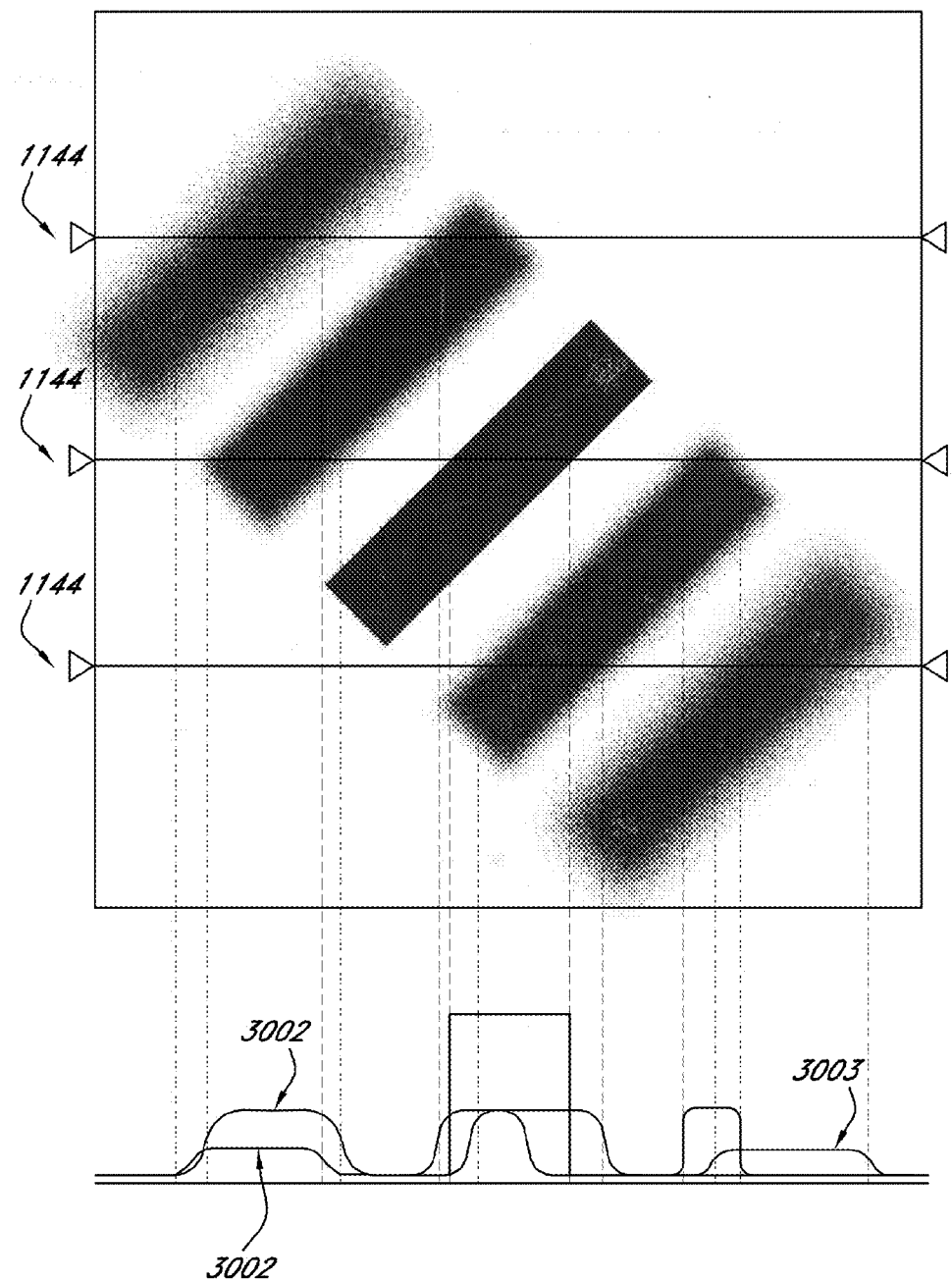
FIG. 14 shows a horizontal line graph conveying focus level data with three separate lines, each of which lines corresponds to a different horizontal scan line.

The processor need not generate an average focus level for multiple scan lines. FIG. 14 shows a graph display with a graph line 3001-03 corresponding to each scan line 1144. Alternatively, each graph line might convey average focus level data from multiple scan lines as an aid to the user.

In addition, the processor 928 might apply a secondary filtering algorithm to the focus level data from one or more scan lines. For instance, the processor 928 might apply an algorithm that zeroes all focus level values below a certain threshold. Such an algorithm might be used to eliminate noise from the display, to avoid distracting the user. The threshold may or may not be set at the same point as the baseline x-axis 312 in the display, depending on the desired height of the line graph 300 in the display. Indeed, the camera might allow the user to set the threshold. Like the x-axis 312 baseline, this algorithmic threshold might be set according to either an absolute value related to the slope of the gradient, as calculated by an edge detection algorithm. Or, it might be a function of the average level of focus of the image. For instance, the algorithm might eliminate focus level values for objects that have less than a threshold such as about 150% of the average focus level of the image. A secondary algorithm might also be used to smooth the focus level data, again to present a simplified, easily perceived waveform to the user. This technique might be useful with edge detection algorithms, which tend to produce spikes.

In short, the scan line embodiments are not limited by any particular scan lines or choice of pixels within those scan lines. Rather, the scan lines might be implemented in any permutation that satisfies a desired balance between computational speed, detail of information, and method of display to the user.

Scan lines are merely one method of applying a focus level detection algorithm. The algorithm might compute focus level information for the entire image, or for some alternative subset of that image. That alternative subset may be a geometric area. The geometric area might be defined by the user or it might be set by an algorithm, for example, to track a moving object in the viewfinder. The alternative subset might also be a pattern of pixels, designed as a representative sampling of the image, but at a lower level of detail and therefore requiring fewer computations.

In order to display focus level data in the pattern of a grid, the algorithm must calculate focus level data for at least a portion of each region within the grid. The algorithm might calculate focus level data for only a pixel within each region. The algorithm might calculate focus level data for the entire region and average the data to display an indication of the focus level.

If the algorithm calculates enough focus level data—at least enough for a representative sampling of the image—it is possible to display to the user focus level information based on edges superimposed on the image. Because an edge-detection algorithm returns data that corresponds to the edges of each object, the display might use that data to highlight the edges of objects in the viewfinder in real time. This might be done by varying the brightness of the edges of objects or by drawing a color around objects, the shade or width of which would correspond to the degree of focus.

Algorithms that generate reliable focus level data for entire objects enable other display techniques. One display varies the relief of an object according to its focus level. So, in focus objects would bulge out of the picture and become more prominent than unfocused objects. Similarly, another display renders objects in three dimensions when they are focused. The further out of focus the object becomes, the flatter it becomes in display.

It should be understood that the embodiments described herein may be implemented in a variety of ways. Other embodiments that are apparent to those of ordinary skill in the art, including embodiments which do not provide all of the benefits and features set forth herein, are also within the scope of this invention. For example, the camera could interface with a physically separate image processing device, such as a computer, or the image processing capabilities could be implemented within the camera. Further, algorithms may be implemented in a variety of ways, such as in hardware, software, or a combination of hardware and software. While some of the embodiments described herein provide specific details for implementation, the scope of the disclosure is intended to be broad and not limited to the specific embodiments described. Accordingly, details described in the specification should not be construed as limitations of the claimed invention. Rather, the scope of the claims should be ascertained from the language of the claims.

What is claimed is:

1. A method of providing feedback to allow focusing of an image in real time, comprising:
    receiving pixel data representing an image, the image comprising a first region and a second region different from the first region;
    determining a degree of focus for the first region using a first set of the pixel data corresponding to the first region and a degree of focus for the second region using a second set of the pixel data corresponding to the second region;
    generating a first visual indication of the degree of focus for the first region and a second visual indication of the degree of focus for the second region;
    providing on an electronic display the first visual indication superimposed on a graphical representation of the first region together with the second visual indication superimposed on a graphical representation of the second region, the electronic display comprising one or more display screens;
    subsequent to providing on the electronic display the first visual indication and the second visual indication, detecting a user adjustment of focus of the image;
    in response to detecting the user adjustment, receiving updated pixel data representing the image subsequent to the user adjustment of focus of the image;
    determining an updated degree of focus for the first region using a first set of the updated pixel data corresponding to the first region and an updated degree of focus for the second region using a second set of the updated pixel data corresponding to the second region; and
    changing the first visual indication on the electronic display responsive to the updated degree of focus for the first region and the second visual indication on the electronic display responsive to the updated degree of focus for the second region.

2. The method of claim 1, wherein the first visual indication on the electronic display is an outline around a feature of the graphical representation of the first region.

3. The method of claim 2, wherein said changing comprises changing a hue of the outline responsive to the updated degree of focus for the first region.

4. The method of claim 3, wherein said changing comprises changing the hue from violet to red.

5. The method of claim 1, wherein the first visual indication on the electronic display is a waveform.

6. The method of claim 5, wherein lines of the waveform indicate the degree of focus for the first region.

7. The method of claim 1, wherein the first visual indication on the electronic display indicates the degree of focus for the first region relative to the degree of focus for the second region, the first region being adjacent to the second region.

8. The method of claim 1, wherein the first visual indication on the electronic display indicates the degree of focus for the first region relative to an average degree of focus for a plurality of regions of the image other than the first region, the plurality of regions comprising the second region and each being adjacent to the first region.

9. The method of claim 1, wherein the first region corresponds to the same number of pixels of the pixel data as the second region.

10. The method of claim 1, wherein said determining the degree of focus for the first region comprises using an edge detection algorithm to determine one or more values indicative of the degree of focus for the first region, and said generating the first visual indication comprises generating the first visual indication using the one or more values.

11. The method of claim 1, wherein the first visual indication on the electronic display is a line graph.

12. The method of claim 11, wherein the line graph is a horizontal line graph.

13. The method of claim 11, wherein the line graph is a vertical line graph.

14. The method of claim 1, wherein
    said determining the degree of focus for the first region comprises determining the degree of focus for the first region without using the pixel data other than the first set of the pixel data;
    said determining the degree of focus for the second region comprises determining the degree of focus for the second region without using the pixel data other than the second set of the pixel data;
    said determining the updated degree of focus for the first region comprises determining the updated degree of focus for the first region without using the updated pixel data other than the first set of the updated pixel data; and
    said determining the updated degree of focus for the second region comprises determining the updated degree of focus for the second region without using the updated pixel data other than the second set of the updated pixel data.

15. An apparatus for providing feedback to allow focusing of an image in real time, the apparatus comprising:
    an image sensor;
    an electronic display comprising one or more display screens; and
    one or more processors in communication with the image sensor and the electronic display, the one or more processors being configured to:
        receive, from the image sensor, pixel data representing an image, the image comprising a first region and a second region different from the first region,
        determine a degree of focus for the first region using a first set of the pixel data corresponding to the first region and a degree of focus for the second region using a second set of the pixel data corresponding to the second region,
        generate a first visual indication of the degree of focus for the first region and a second visual indication of the degree of focus for the second region,
        provide on the electronic display the first visual indication superimposed on a graphical representation of the first region together with the second visual indication superimposed on a graphical representation of the second region,
        subsequent to providing on the electronic display the first visual indication and the second visual indication, detect a user adjustment of focus of the image,
        in response to detecting the user adjustment, receive, from the image sensor, updated pixel data representing the image subsequent to the user adjustment of focus of the image, determine an updated degree of focus for the first region using a first set of the updated pixel data corresponding to the first region and an updated degree of focus for the second region using a second set of the updated pixel data corresponding to the second region, and change the first visual indication on the electronic display responsive to the updated degree of focus for the first region and the second visual indication on the electronic display responsive to the updated degree of focus for the second region.

16. The apparatus of claim 15, wherein the first visual indication on the electronic display is a waveform.

17. The apparatus of claim 15, wherein the first visual indication on the electronic display is an outline around a feature of the graphical representation of the first region.

18. The apparatus of claim 15, wherein the one or more processors is configured to provide on the electronic display an indication of boundaries of the first region and the second region superimposed on a graphical representation of the image.

19. The apparatus of claim 15, wherein the first visual indication on the electronic display indicates the degree of focus for the first region relative to the degree of focus for the second region, the first region being adjacent to the second region.

20. The apparatus of claim 15, wherein the first visual indication on the electronic display indicates the degree of focus for the first region relative to an average degree of focus for a plurality of regions of the image other than the first region, the plurality of regions comprising the second region and each being adjacent to the first region.

* * * * *

UNITED STATES PATENT AND TRADEMARK OFFICE
CERTIFICATE OF CORRECTION

PATENT NO. : 9,692,958 B2
APPLICATION NO. : 14/561059
DATED : June 27, 2017
INVENTOR(S) : Thomas Graeme Nattress Page 1 of 1

It is certified that error appears in the above-identified patent and that said Letters Patent is hereby corrected as shown below:

On the Title Page

In Column 2 (item (56)) at Line 16, Under Other Publications, change "Digigal" to --Digital--.

In the Specification

In Column 4 at Line 2, Change "row," to --low,--.

Signed and Sealed this
Tenth Day of April, 2018

Andrei Iancu
*Director of the United States Patent and Trademark Office*